US008973881B2

(12) United States Patent
Mihajlovic

(10) Patent No.: US 8,973,881 B2
(45) Date of Patent: Mar. 10, 2015

(54) MODULAR SUPPORT ASSEMBLY

(76) Inventor: Miodrag Mihajlovic, New York, NY (US)

(*) Notice: Subject to any disclaimer, the term of this patent is extended or adjusted under 35 U.S.C. 154(b) by 235 days.

(21) Appl. No.: 12/952,832

(22) Filed: Nov. 23, 2010

(65) Prior Publication Data

US 2011/0121145 A1 May 26, 2011

Related U.S. Application Data

(60) Provisional application No. 61/264,090, filed on Nov. 24, 2009.

(51) Int. Cl.
| | |
|---|---|
| A47G 1/17 | (2006.01) |
| A47F 7/22 | (2006.01) |
| G09F 23/08 | (2006.01) |
| F21V 35/00 | (2006.01) |
| G09F 7/04 | (2006.01) |
| G09F 7/10 | (2006.01) |
| H01F 7/02 | (2006.01) |
| A63F 9/12 | (2006.01) |
| A47G 7/06 | (2006.01) |
| F16B 1/00 | (2006.01) |
| A47B 87/02 | (2006.01) |
| F21S 6/00 | (2006.01) |
| F21V 17/10 | (2006.01) |
| F21Y 101/02 | (2006.01) |

(52) U.S. Cl.
CPC ......... *G09F 23/08* (2013.01); *A63F 2009/1212* (2013.01); *A47G 7/06* (2013.01); *F16B 2001/0035* (2013.01); *A47B 87/0276* (2013.01); *F21S 6/00* (2013.01); *F21S 6/001* (2013.01); *F21V 17/105* (2013.01); *F21V 35/00* (2013.01); *F21Y 2101/02* (2013.01); *G09F 7/04* (2013.01); *G09F 7/10* (2013.01); *H01F 7/0252* (2013.01)
USPC ............ 248/309.4; 248/206.5; 248/537; 248/539; 206/303; 211/49.1

(58) Field of Classification Search
USPC ............. 248/683, 206.5, 309.4, 188, 346.06, 248/537, 539, 310, 346.3; 273/153 R, 155, 273/156; 211/71.01, 74, 49.1; 40/449, 503, 40/506, 618, 621, 299.01; 206/303, 812, 206/821
See application file for complete search history.

(56) References Cited

U.S. PATENT DOCUMENTS

| | | | | |
|---|---|---|---|---|
| 3,605,229 | A * | 9/1971 | O'Neal et al. | 492/8 |
| 4,818,305 | A * | 4/1989 | Steingroever | 148/103 |
| 4,865,324 | A * | 9/1989 | Nesis | 273/155 |
| 5,746,639 | A * | 5/1998 | Bloom et al. | 446/98 |
| 5,788,232 | A * | 8/1998 | Binkley | 273/155 |
| 5,957,453 | A * | 9/1999 | Binkley | 273/153 S |
| 6,749,480 | B1 * | 6/2004 | Hunts | 446/92 |
| 7,679,205 | B1 * | 3/2010 | Burns | 290/1 R |
| 8,187,006 | B2 * | 5/2012 | Rudisill et al. | 439/39 |

* cited by examiner

*Primary Examiner* — Tan Le
(74) *Attorney, Agent, or Firm* — Laurence A. Greenberg; Werner H. Stemer; Ralph E. Locher

(57) ABSTRACT

A modular support assembly is provided for supporting a useful and/or decorative article. Each module of the assembly adheres to adjacent module(s) via a magnetic force attraction. The height of the modular assembly can be adjusted, as desired, by the addition/removal of various modules to/from the assembly.

17 Claims, 18 Drawing Sheets

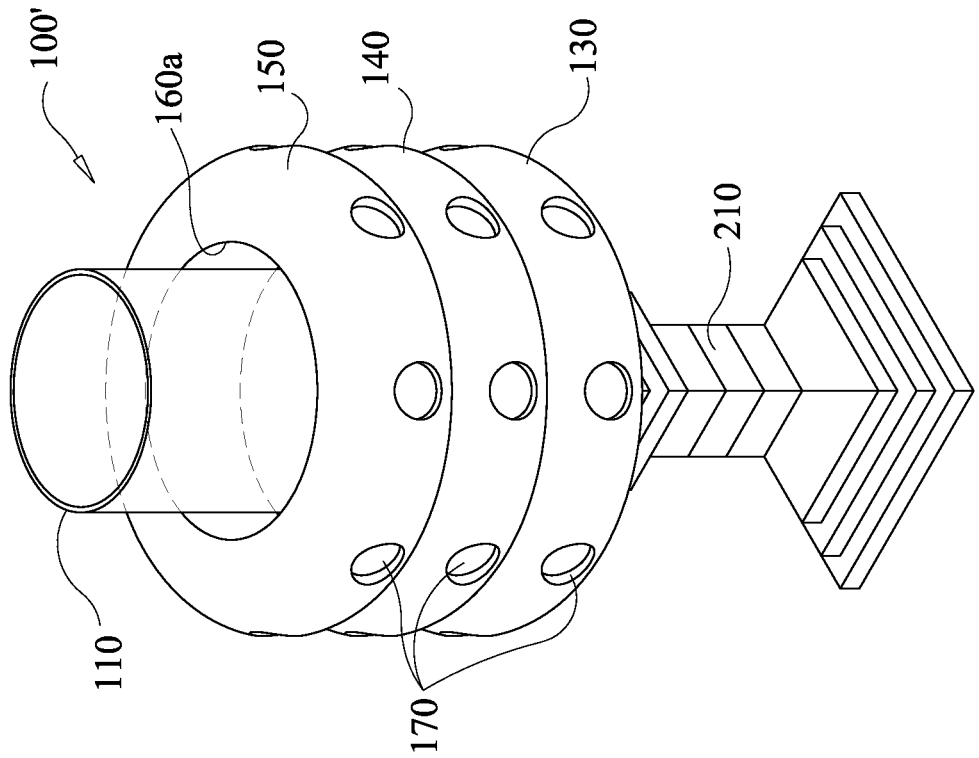
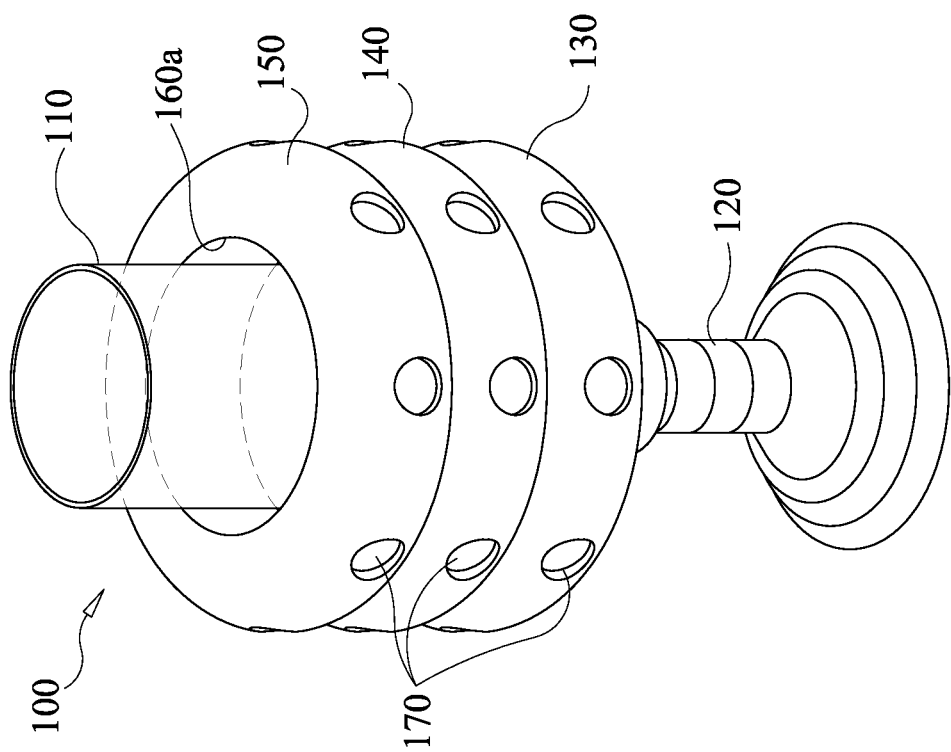

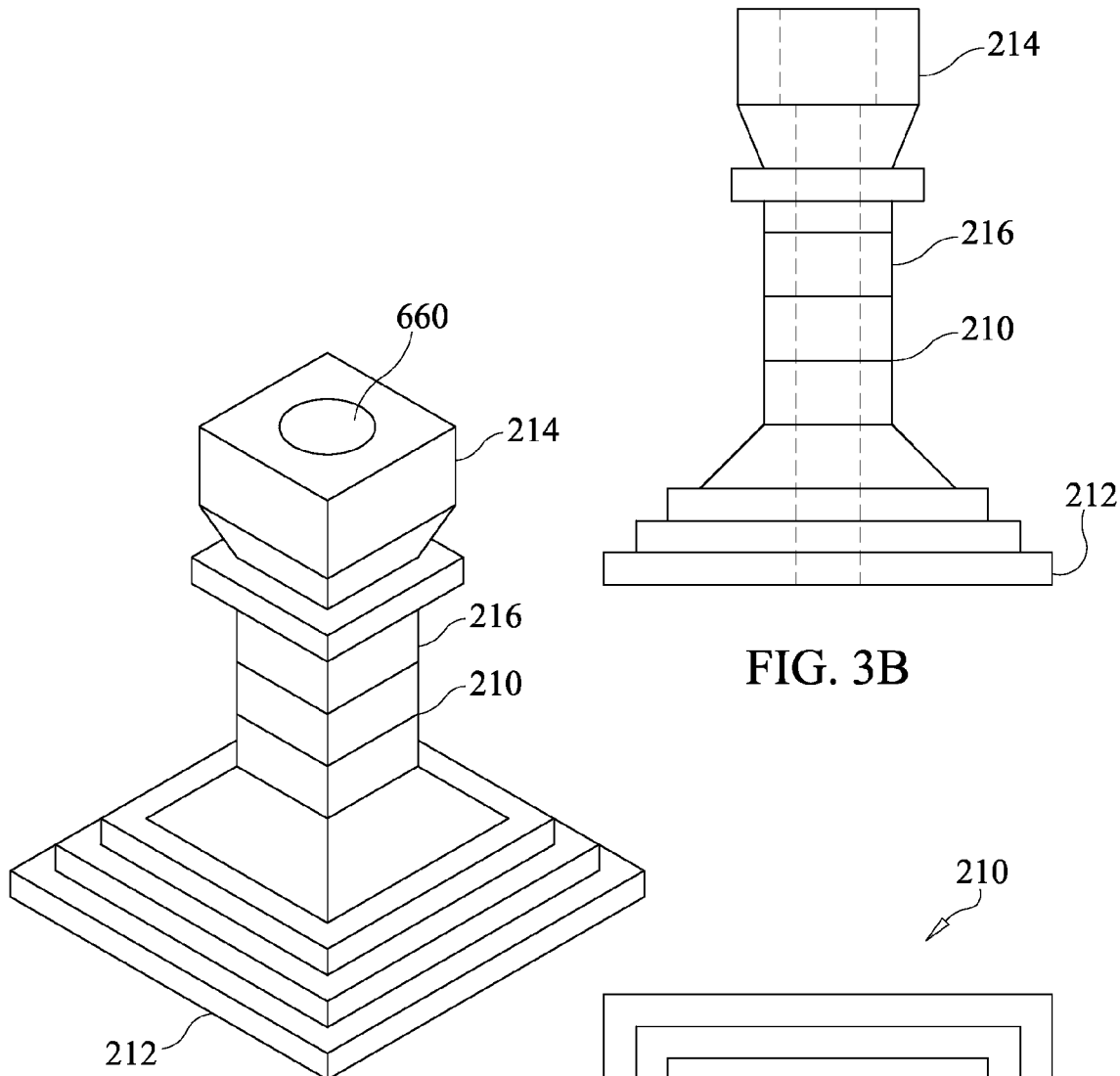
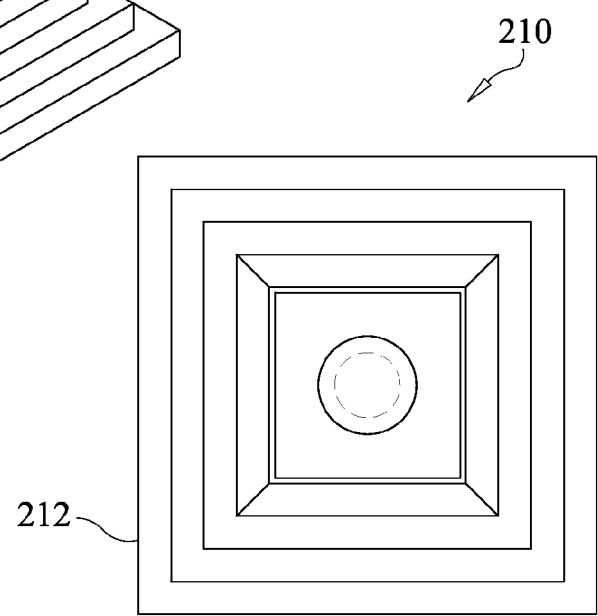
FIG. 3A
FIG. 3B
FIG. 3C

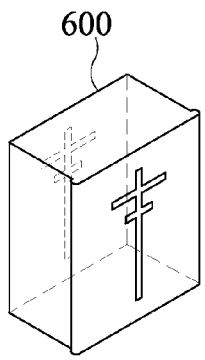
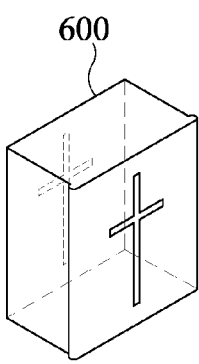
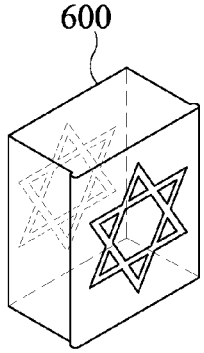
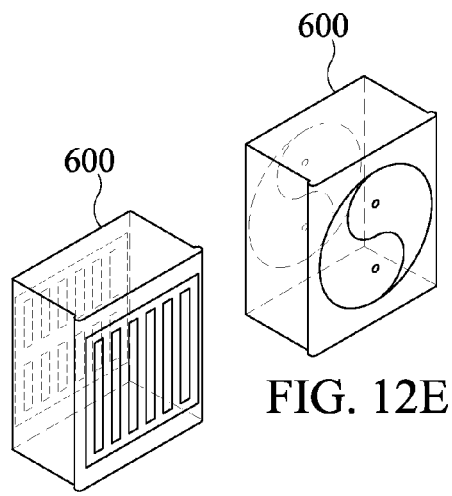
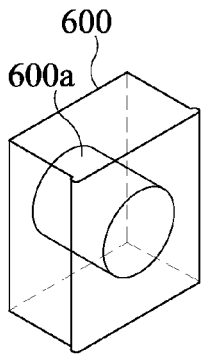
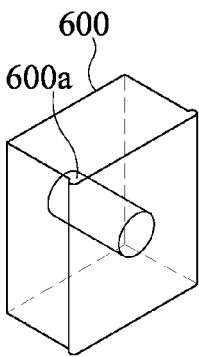
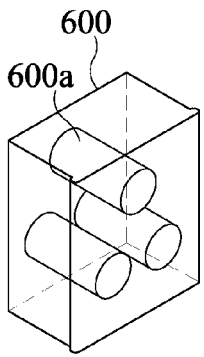
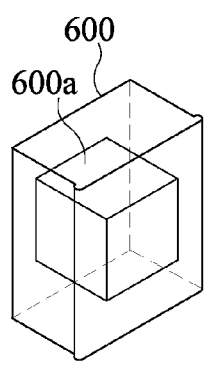
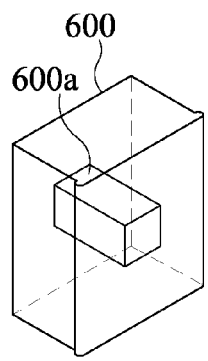
FIG. 12A
FIG. 12B
FIG. 12C
FIG. 12D
FIG. 12E
FIG. 13A
FIG. 13B
FIG. 13C
FIG. 13D
FIG. 13E

_US 8,973,881 B2_

MODULAR SUPPORT ASSEMBLY

CROSS-REFERENCE TO RELATED APPLICATIONS

The present application claims priority to: Provisional Patent Application No. 61/264,090, filed on Nov. 24, 2009, and entitled "Modular Support Assembly"; that application being incorporated herein, by reference, in its entirety.

FIELD OF INVENTION

The invention relates to a modular support assembly, and more particularly, to a modular assembly for supporting a useful and/or decorative article, such as a glass, a vase and/or a candle.

BACKGROUND OF THE INVENTION

Assemblies for supporting useful and/or decorative articles are known. However, what is needed is a modular support assembly that can be easily adapted to the article it is to support.

SUMMARY OF THE INVENTION

It is accordingly an object of this invention to provide a modular support assembly that overcomes the disadvantages of the heretofore-known devices. In particular, a modular support assembly and method of use is provided wherein each module of the assembly adheres to adjacent module(s) via a magnetic force attraction. The height of the modular assembly can be adjusted, as desired, by the addition/removal of various modules to/from the assembly Although the invention is illustrated and described herein as embodied in a modular support assembly, it is nevertheless not intended to be limited to only the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1A is a perspective view of a modular support assembly in accordance with one particular embodiment of the present invention;

FIG. 2A is a side perspective view of a modular support assembly in accordance with another particular embodiment of the present invention;

FIG. 3A is a side perspective view of a base portion in accordance with one particular embodiment of the present invention;

FIG. 3B is a side plan view of the base portion of FIG. 3A;

FIG. 3C is an elevational view from the top of the base portion of FIG. 3A;

FIGS. 12A-12E show various examples of inserts including decorative indicia in accordance with the instant invention; and FIGS. 13A-13E show various possible configurations of inserts including magnets in accordance with the instant invention;

DETAILED DESCRIPTION OF THE INVENTION

Figure 1B:
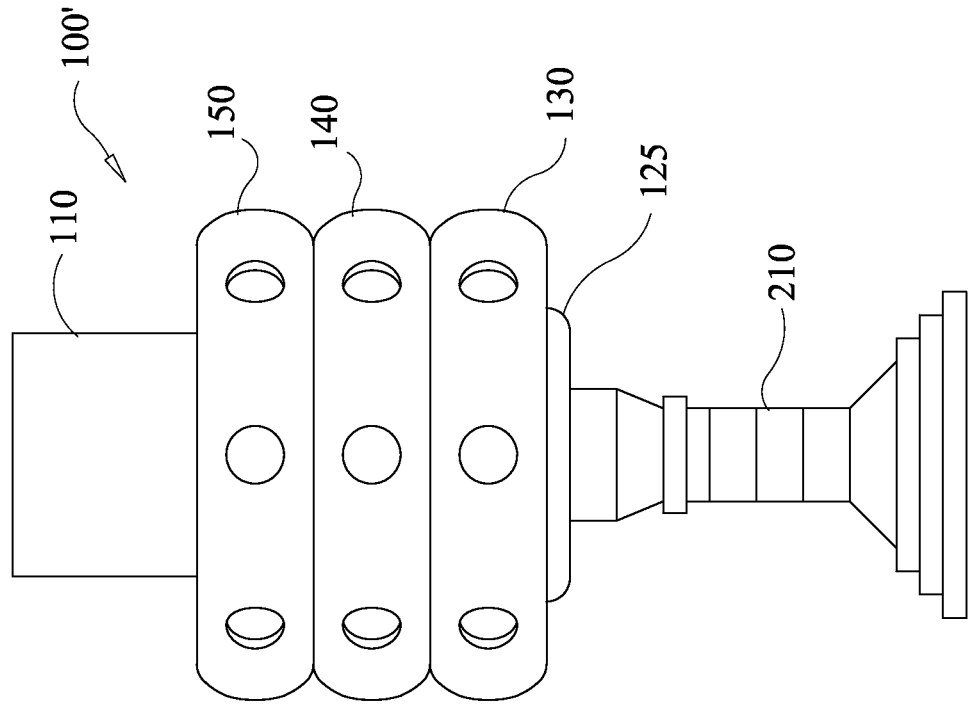
FIG. 1B is a side plan view of the modular support assembly of FIG. 1A.
Figure 2B:
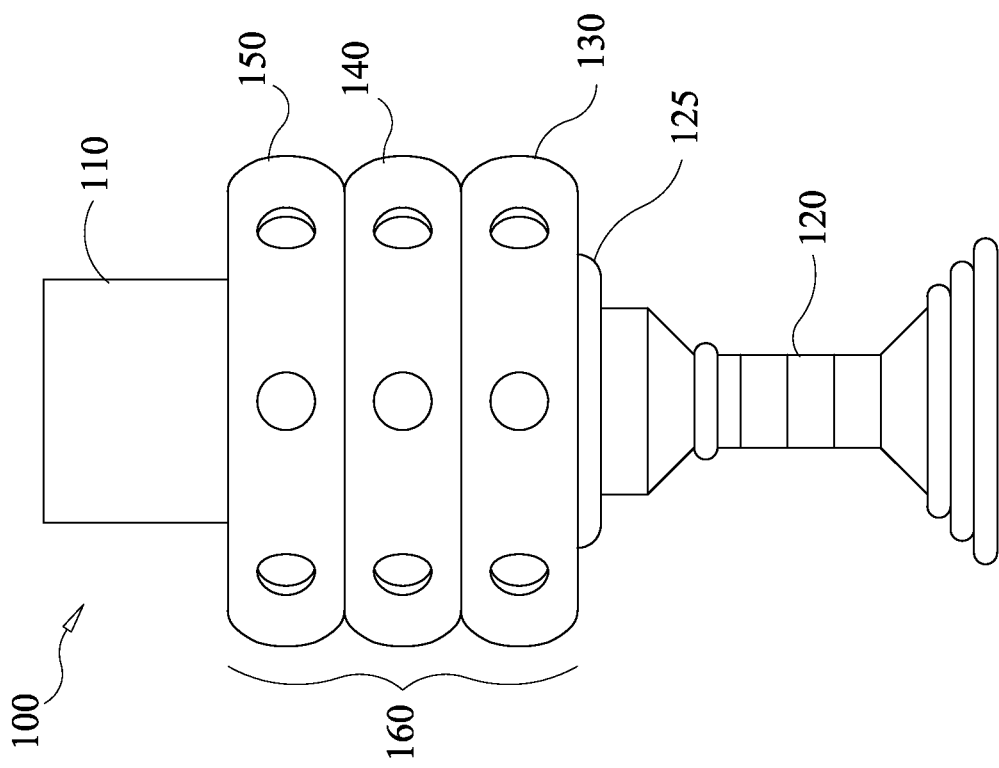
FIG. 2B is a side plan view of the modular support assembly of FIG. 2A.

Referring now to FIGS. 1A-1C, 4A-4C, 6, 15 and 16, there is shown a first embodiment of a modular support assembly 100 in accordance with the instant invention. The modular support assembly 100 is configured to accept and hold an object 110, such as a glass, a vase or a candle. The modular support assembly 100, in accordance with the present embodiment, is formed by a plurality of stacked modules that adhere to one another by magnetic force attraction. This force of attraction can be broken simply by twisting the modules. However, in one particular embodiment, the magnetic attraction is strong enough that the entire assembly can be placed upside down without the magnets, and therefore, the assembly, disconnecting.

The modular support assembly 100 includes a pedestal portion 120 and a holder portion 160. The holder portion 160 of the instant embodiment includes a base insert 125, a first end module 130, at least one center module 140 and a second end module 150. Each module 125, 130, 140, 150 of the holder portion 160 is separable from each other module 120, 125, 130, 140, 150, as shown in FIG. 6, and is additionally separable from the pedestal portion 120.

More particularly, the modular support assembly 100 is made up of several separable modules held together in proper alignment by magnets. In the instant embodiment, each of the ring modules 130, 140 and 150 are formed as an annulus or ring, which defines a hole in the middle. When stacked together, the modules 130, 140 and 150 form a chamber into which can be placed a useful and/or decorative object 110, such as a glass or vase. One particular advantage of the instant invention is that the height of the holder portion 160, and thus the volume of the chamber therein, can be increased by the addition of more center modules 140, as shown more particularly in connection with the embodiments of FIGS. 9-11. As such, the height of the holder portion 160 can be adapted in each instance to the height of the object 110 selected to be received in the chamber of the holder portion 160. For example, when preparing a center piece for a table, the holder assembly can accommodate any number of vase/glass/candle heights, merely by the addition/subtraction of further center modules 140. It is conceivable that as few as one ring module be used with a pedestal module and still form a support assembly in accordance with the present invention.

As described above and as shown in FIG. 1C, the holder portion 160 additionally includes a base insert 125 that is sized to be received into, and frictionally held within, the hole of the lower or first end module 130. The holder portion 160 forms a floor or platform upon which is received the bottom or base of the object 110. Additionally, the base insert 125 also provides a mounting point for the pedestal 120.

Figure 1C:
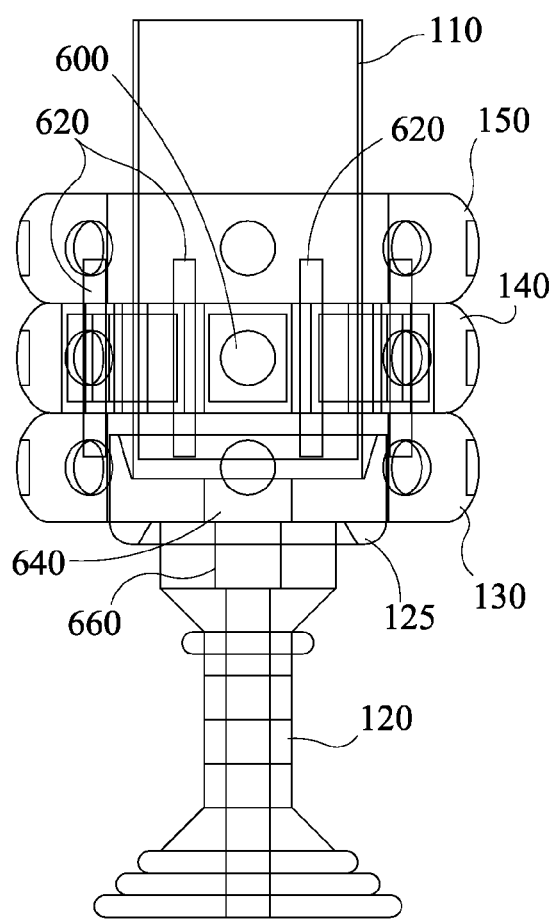
FIG. 1C is a cutaway view of the modular support assembly of FIG. 1A.
Figure 2C:
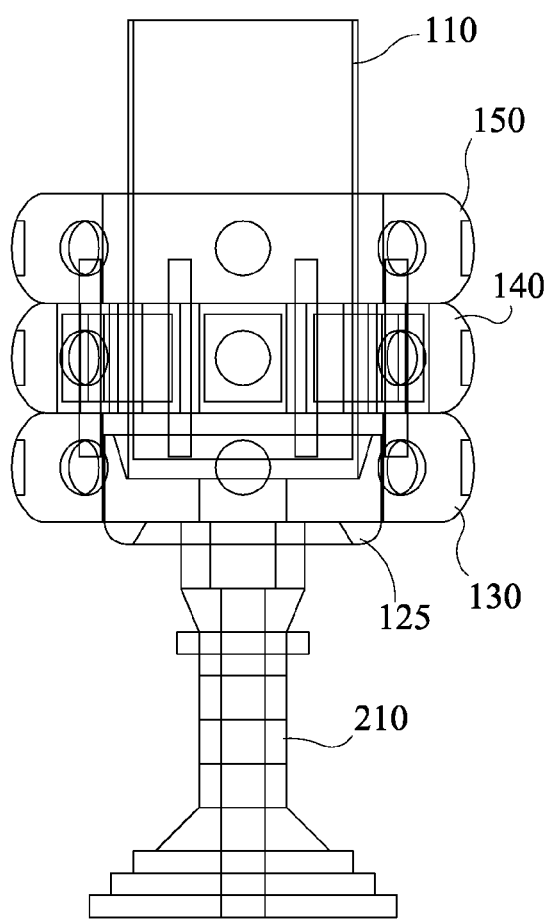
FIG. 2C is a cutaway view of the modular support assembly of FIG. 2A.
Figure 6:
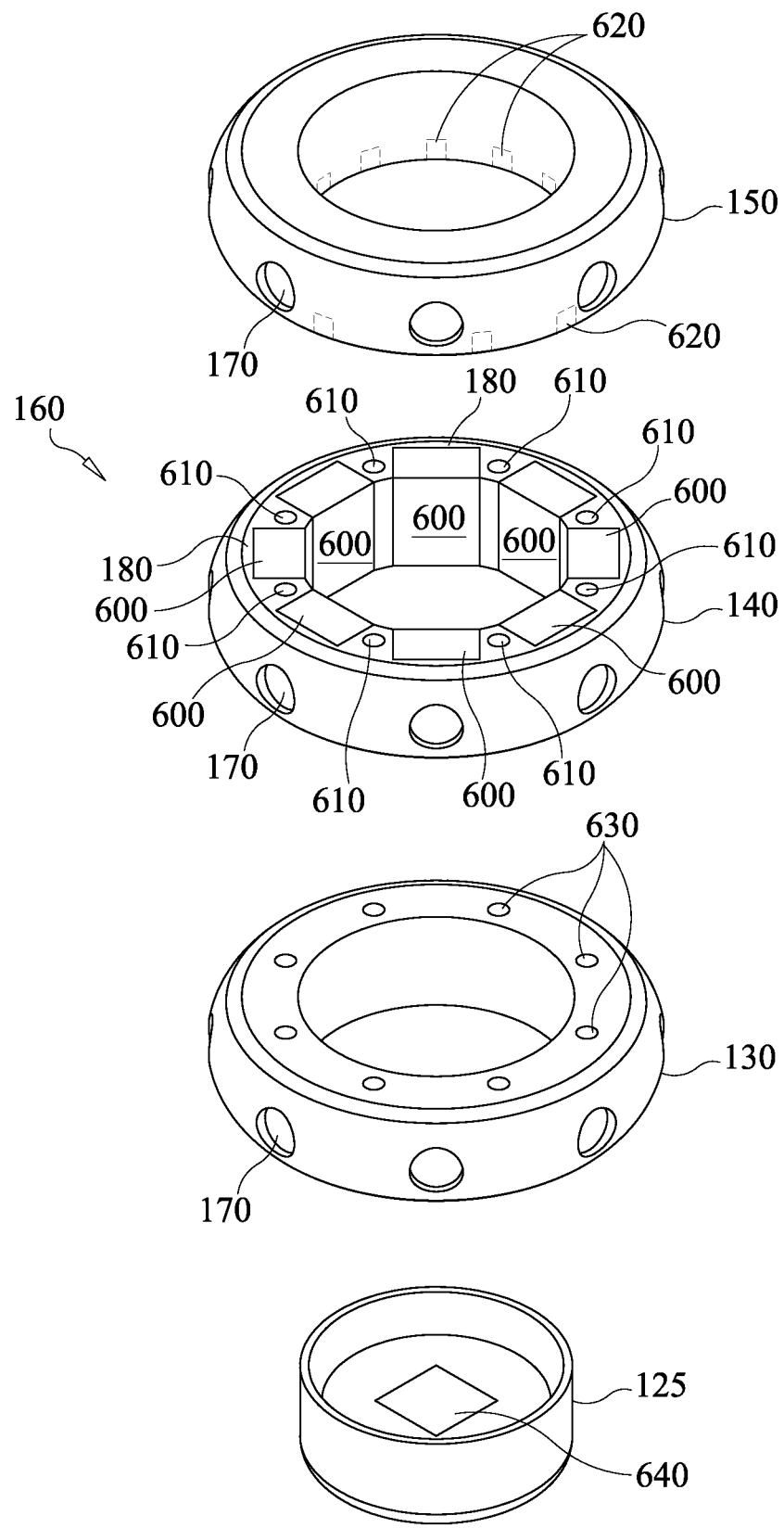
FIG. 6 is an exploded perspective view of the holder portion of a modular support assembly of one particular embodiment of the present invention.
Figure 7:
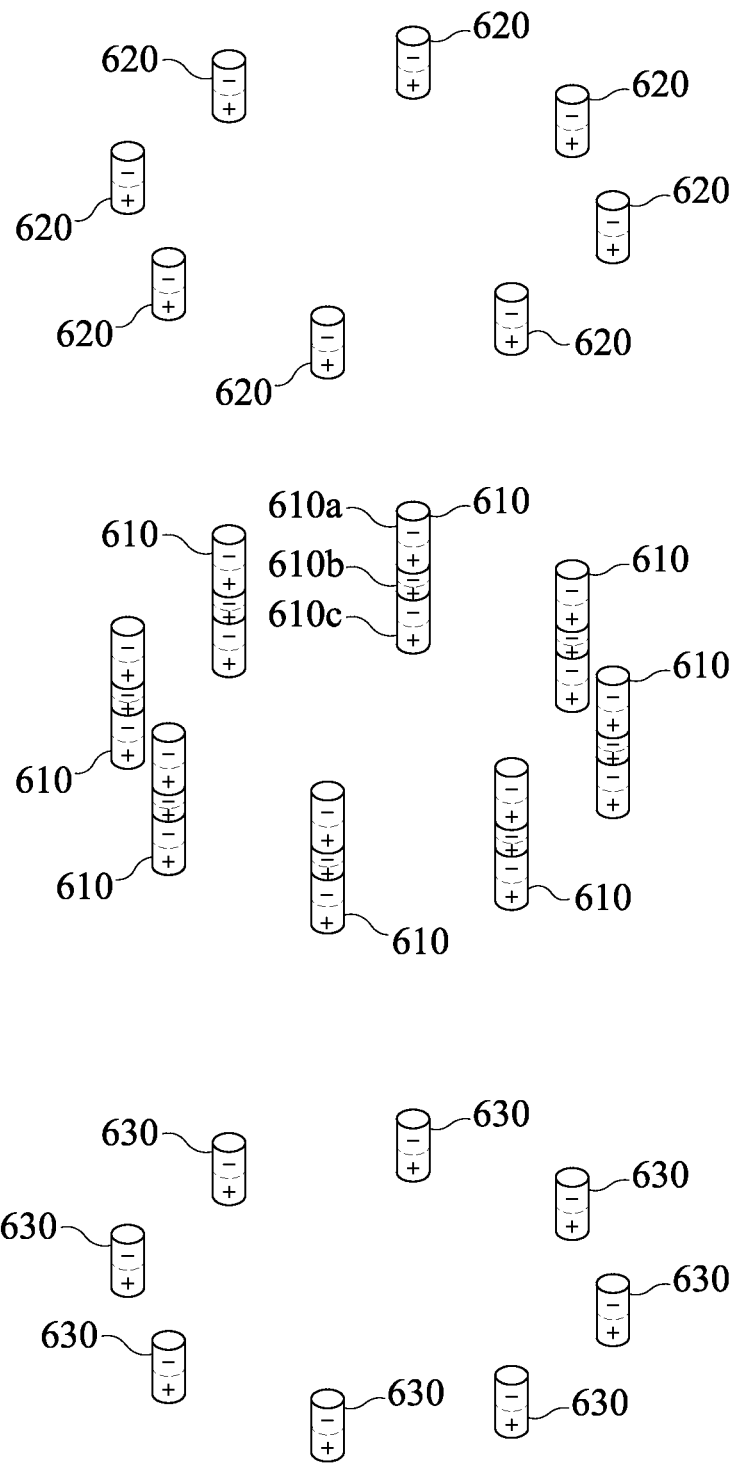
FIG. 7 is an exploded view of the arrangements of the magnets contained in one particular embodiment of the holder portion of FIG. 6.
Figure 8A:
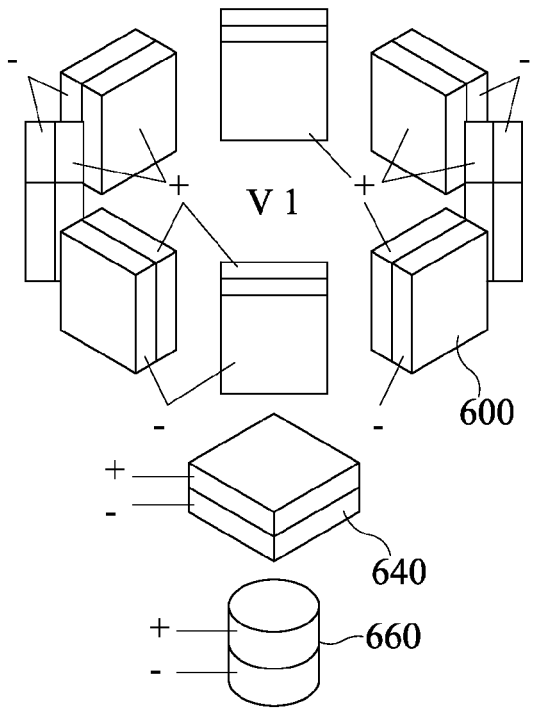
FIGS. 8A-8D show certain possible variations of the arrangements of the magnets in one particular embodiment of the present invention.
Figure 8B:
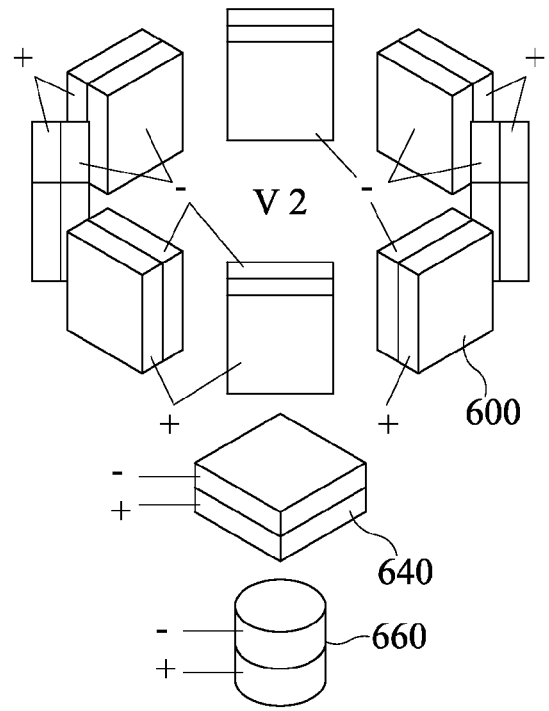
Figure 8C:
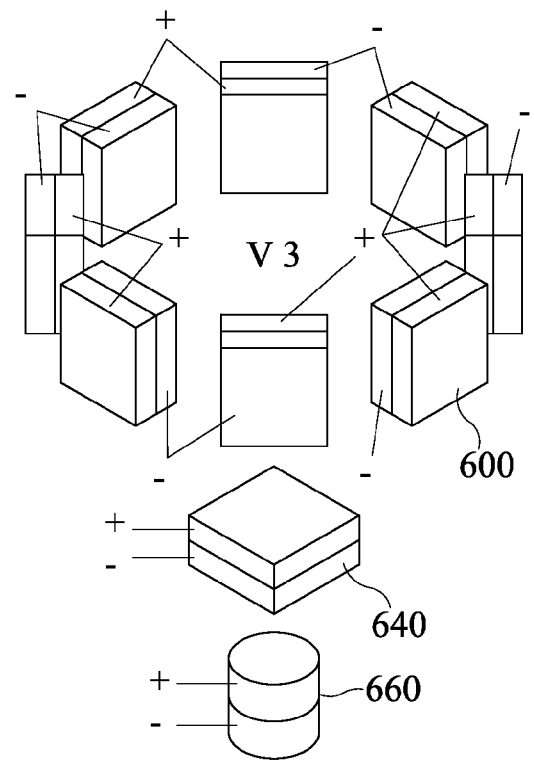
Figure 8D:
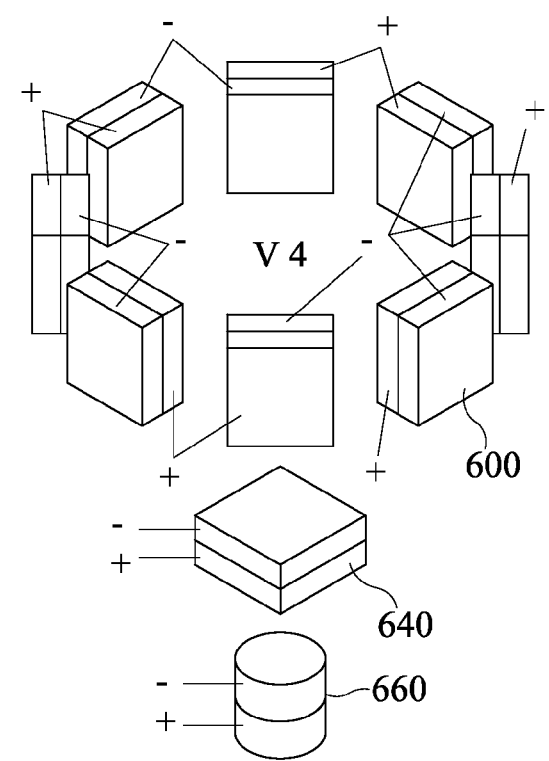

For example, referring more particularly to FIGS. 1C and 6-7, the pedestal 120 includes a magnet 660 centered within its top face. This magnet 660 magnetically engages and holds the magnet 640 centered within the bottom face of the base insert 125. This alignment allows the holder portion 160 to be easily centered on the pedestal 120 without any expertise or tools, as the magnets work to pull the arrangement into the proper alignment.

However, prior to engaging the base insert 125 with the pedestal 120, the base insert is engaged with the first end module 130, for example, by pushing the base insert 120 into the lower portion of the annular hole of the first end module 130. The at least one center module 140 is fitted between the first end module 130 and the second end module 150 and engaged therebetween by the magnetic attraction between the magnets 610 and 620 on the top edge of at least one center module 140 and by the magnets 620 and 630 at the bottom edge of the at least one center module 140. This configuration of magnetic alignments is shown, more particularly, in FIG. 7. Additionally, if desired, the height of the modular support assembly 100 can be further reduced by omitting the at least one center module 140 and directly engaging the magnets 630 with the magnets 620.

Referring more particularly to FIGS. 6-7, the magnets 620 and 630 are all arranged in their respective rings in the same orientation. For example, all of the magnets 620 are oriented such that their positive or "+" poles are proximal to, or adjacent to, the bottom face of the ring 150, while the magnets 630 are all oriented such that their negative or "−" poles are oriented proximal to, or adjacent to, the upper face of the ring 130 (i.e., the upper face of the ring 130 being the face adjacent the lower face of the ring 140). In this orientation, even if the center ring 140 were omitted, the "−" poles of the magnets 630 of the first end module 130 will engage the "+" poles of the magnets 620 of the second end module 150 to hold the rings 130, 150 firmly together in the proper orientation. In one particular embodiment of the present invention, the magnets are selected to be small but powerful NdFeB (neodymium magnets) of various shapes and sizes. In one particular embodiment, the magnets are selected to be ½" long×¼" in diameter.

Although shown as having particular polarity orientations in FIG. 7, other arrangements of the magnets 610, 620, 630 can be provided to the same effect. For example, the polarities of the magnets 620, 630 can be reversed without departing from the scope of the instant invention. Additionally, the polarities of the magnets 610, 620 and 630 can be alternated within each ring 130, 140, 150 (i.e., +, −, +, −, . . . ) and still ensure a proper engagement.

Referring back to FIG. 7, it should be noted that, in order to engage the magnets 620, 630 in the configurations shown in FIG. 7, the magnets 610 of the presently described embodiment each include three bipole magnets 610a, 610b, and 610c. More particularly, the magnets 610a are oriented so that the exposed or proximal pole of the magnet 610a attracts (i.e., is attracted to) the exposed or proximal pole of the magnets 620. Similarly, the magnets 610b are oriented so that the exposed or proximal pole of each magnet 610b attracts (and is attracted to) the exposed or proximal pole of the magnets 630. In the present particular embodiment, the magnets 610c are used to connect the magnets 610a, 610b into a column, thus providing magnetic continuity through the center module 140. Note however, that the magnets 610c can be omitted, if desired, and the magnets 610a, 610b be spaced apart and/or separated by the material of the ring. For example, each of the magnets 610a, 610b can be embedded at or proximal to the upper and lower surfaces, respectively, of the ring 140. As such, the magnets 610a, 610b, engage the magnets 620, 630, respectively, to align and lock the rings 130, 140, 150 into the proper orientation, thus forming a chamber 160a for receiving an object 110.

Note that, in one particular alternate embodiment of the present invention, the magnets 620, 630 can be replaced by a material that is strongly attracted to a magnet, such as iron, steel or a composite thereof. Thus, the assembly 100, would be still be formed by magnetic attraction, wherein the magnets 610 of the center module 140 align and lock with the metal pieces 620, 630 in the end modules 130, 150.

Figure 9:
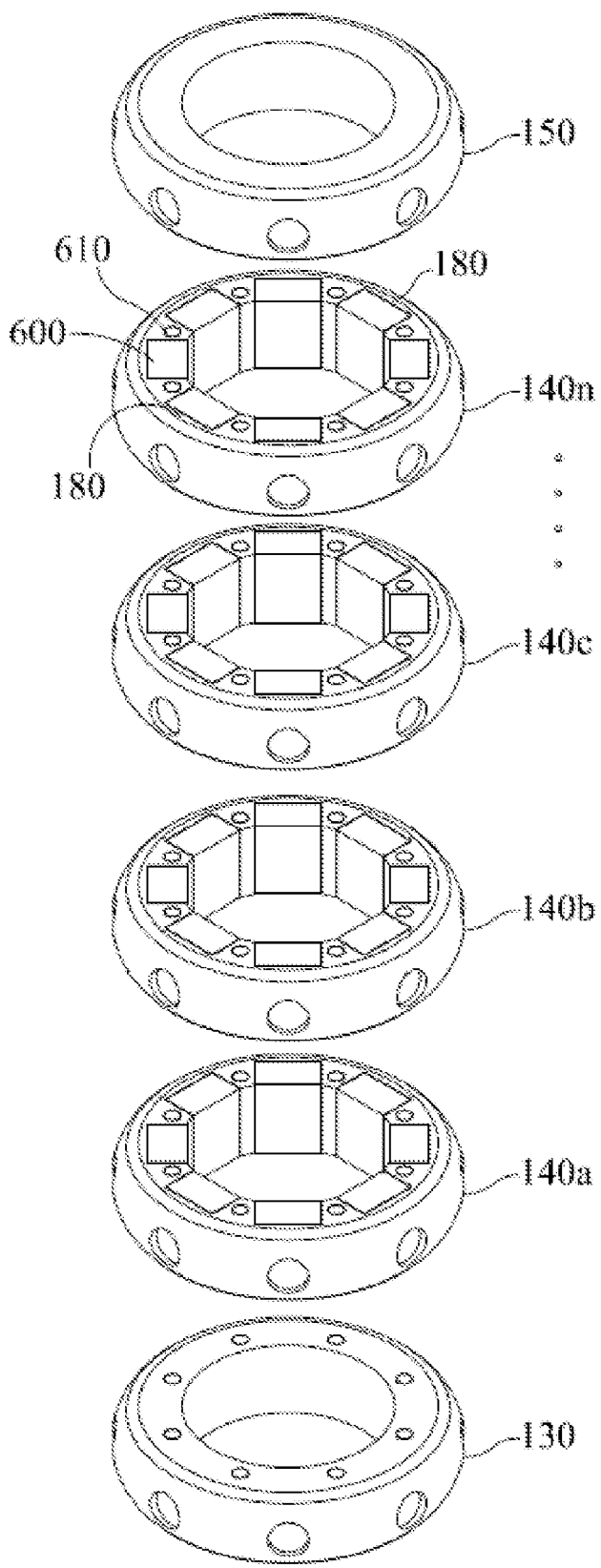
FIG. 9 is an exploded side perspective view of a holder portion for a modular support assembly in accordance with another embodiment of the instant invention.
Figure 10:
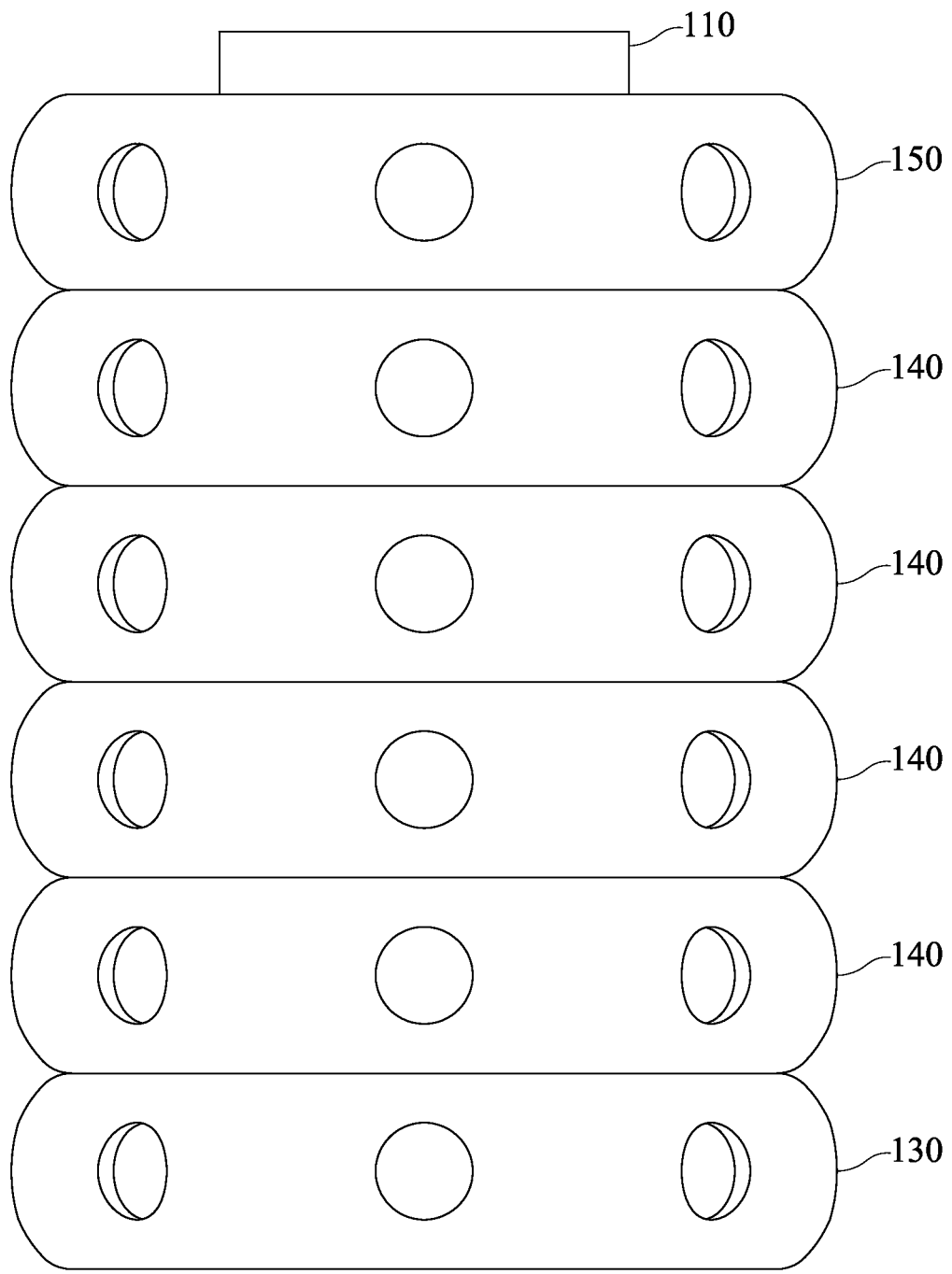
FIG. 10 is a side plan view of a holder portion for a modular support assembly in accordance with another embodiment of the instant invention.
Figure 11:
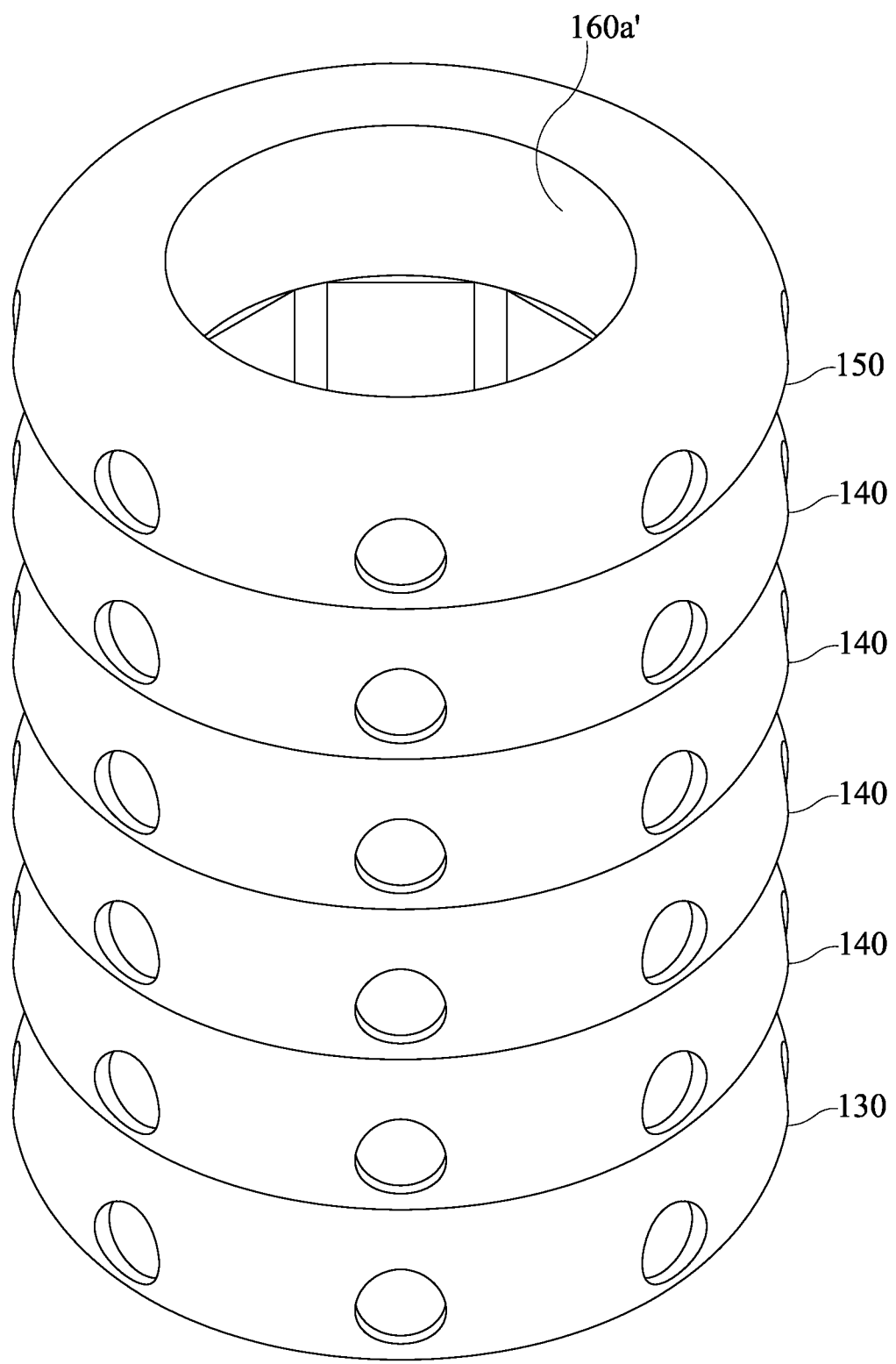
FIG. 11 is a side perspective view of the holder portion of FIG. 10.
Figure 14B:
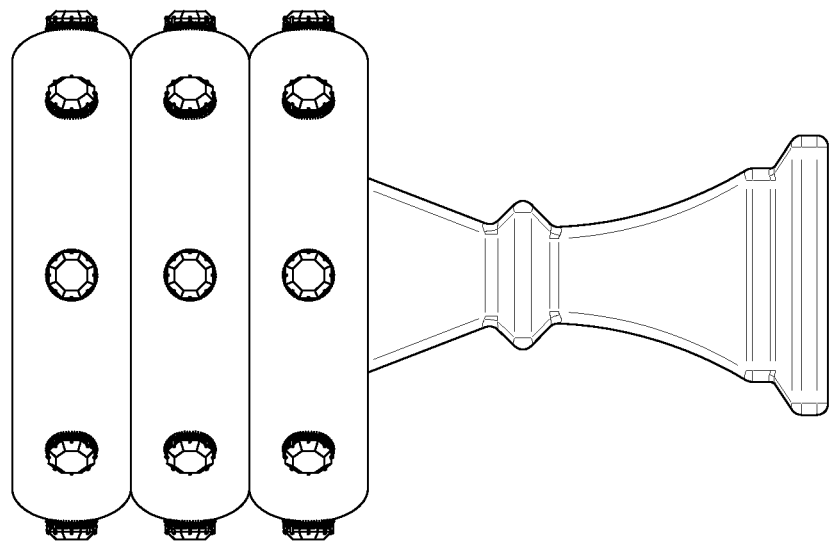
FIGS. 14A-14D show another embodiment of a modular support assembly in accordance with the instant invention.
Figure 14A:
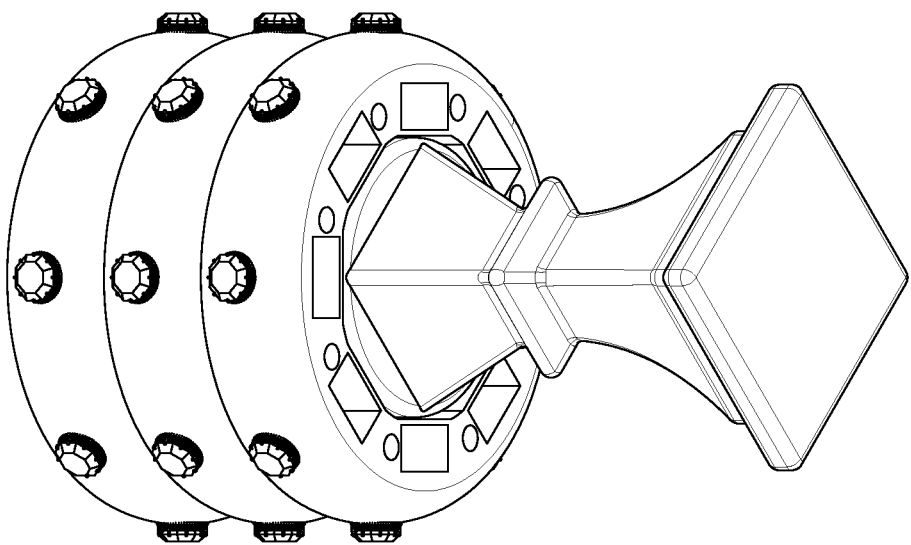
Figure 14D:
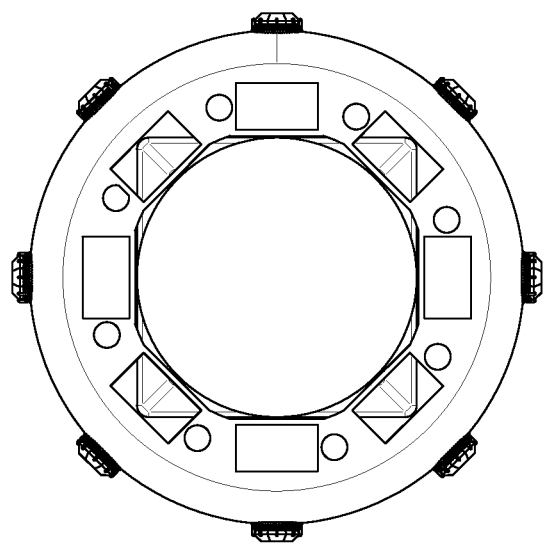
Figure 14C:
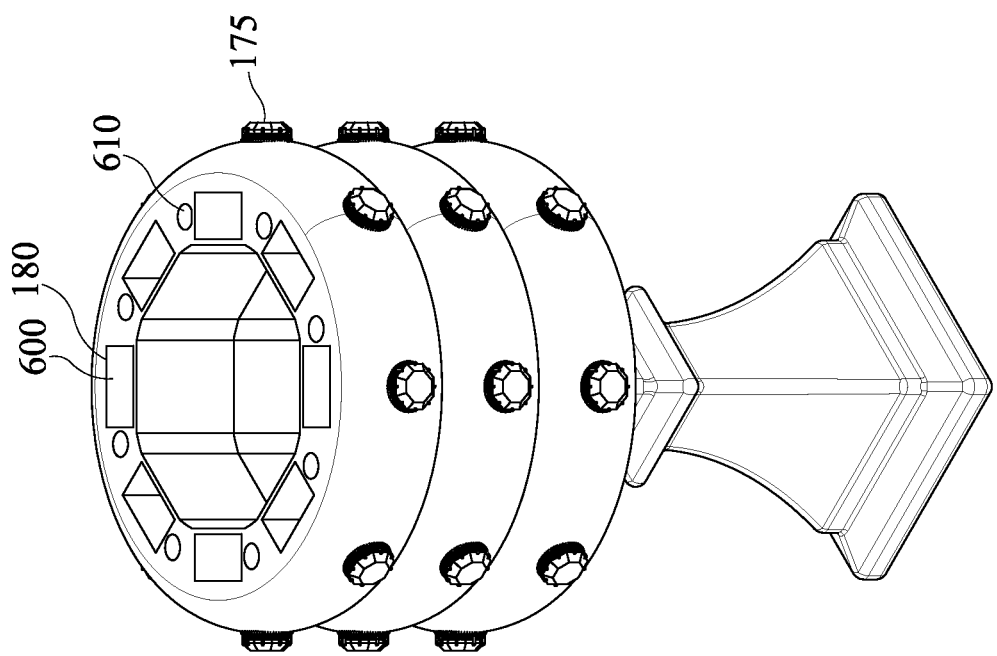
Figure 15:
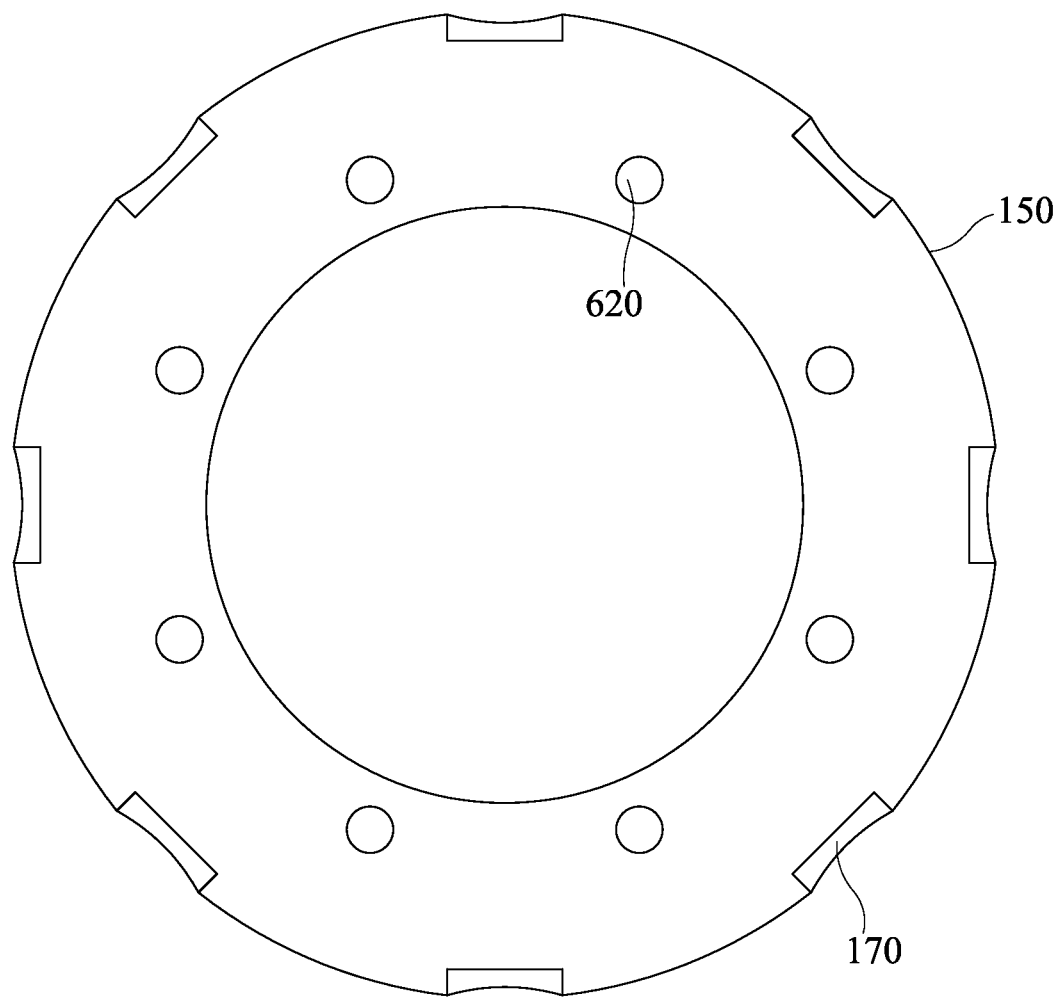
FIG. 15 is a bottom plan view of one particular embodiment of an end module in accordance with the instant invention.
Figure 16:
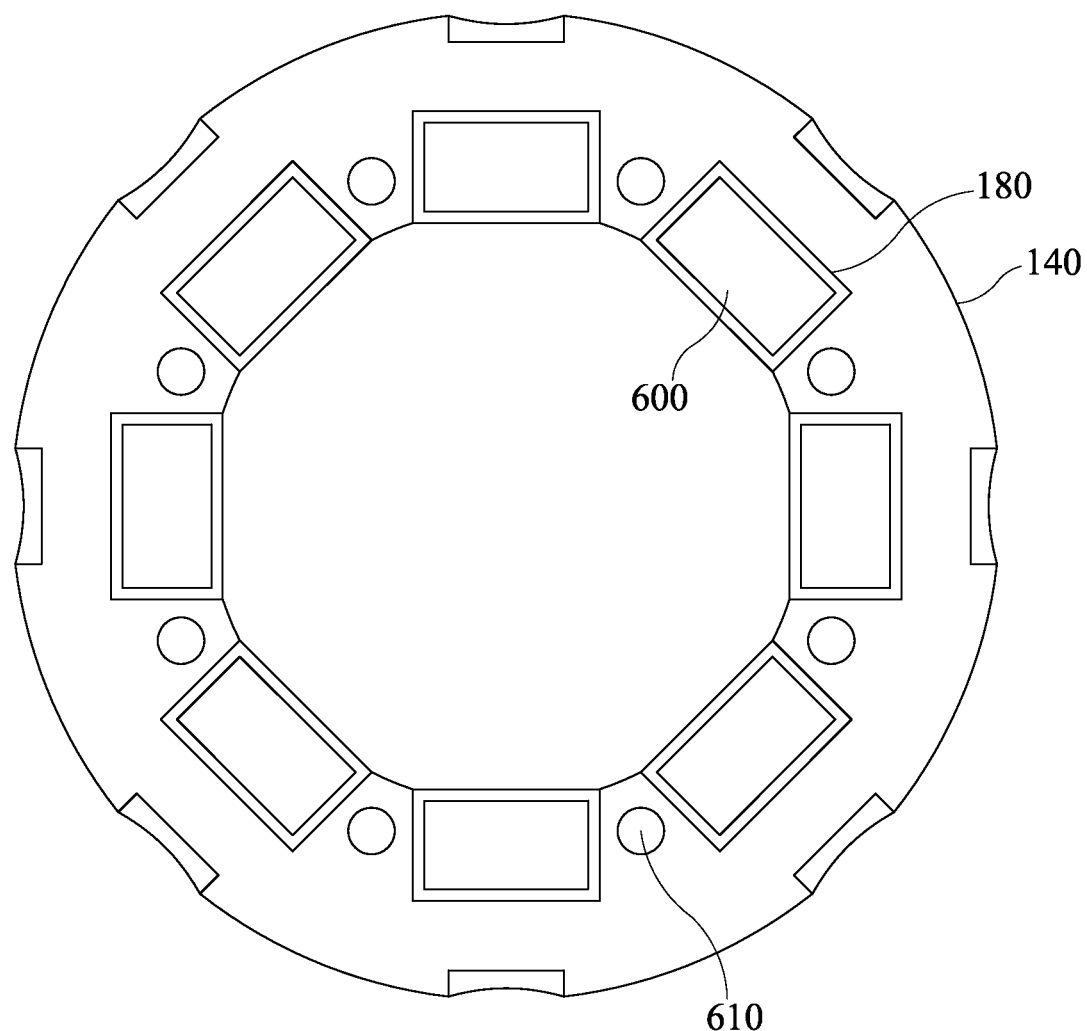
FIG. 16 is a top plan view of one particular embodiment of a center module in accordance with the instant invention.

It is important to note that, due to the modularity of the rings, any number of center modules 140 can be added to make the modular support assembly 100 any desired height. See, for example, FIG. 9 showing a plurality of center rings $140_a$, $140_b$, $140_c$, . . . $140_n$ located between the first end ring 130 and the second end ring 150. This permits the modular support assembly to be adapted by the end user to a variety of heights for holding a variety of objects 110. For example, one particular embodiment illustrated in FIGS. 10 and 11 shows the modular assembly having a first end module 130, four center modules 140 and a second end module 150, thus forming a cavity 160' therethrough. Note that, although not shown in FIGS. 9 and 10, the first end module 130 would be frictionally engaged with a base insert, such as the base insert module 125 of FIG. 1C, and magnetically mounted to a pedestal module, such as the pedestal module 120 of FIG. 1A.

Additionally, the height and/or general appear of the modular support assembly 100 can be adjusted by the selected pedestal module. For example, a variety of pedestals of different heights and designs can be offered and/or provided for use with the holder portion 160. As shown in FIGS. 1A-1C and 4A-4C, the pedestal module 120 has a circular motif, including a circular foot 122, neck 124 and support 126. As previously discussed, the magnet 660 in the support 126 of the base engages a magnet (640 of FIG. 1C) in the base insert (125 of FIG. 1C) to align and lock the holder portion 160 to the pedestal module 120.

Note, however, that the pedestal module of the instant invention is not limited to the particular ornamental appearance of the pedestal module 120. Other pedestal module designs can be used. For example, a pedestal module 210 having a square motif is shown in FIGS. 2A-2C and 3A-3C. Like the pedestal module 120, the pedestal module 210 includes a foot 212, a neck 216 and a support 214, which support includes a magnet 660 for engaging a magnet 640 in the base insert 125.

Figure 4B:
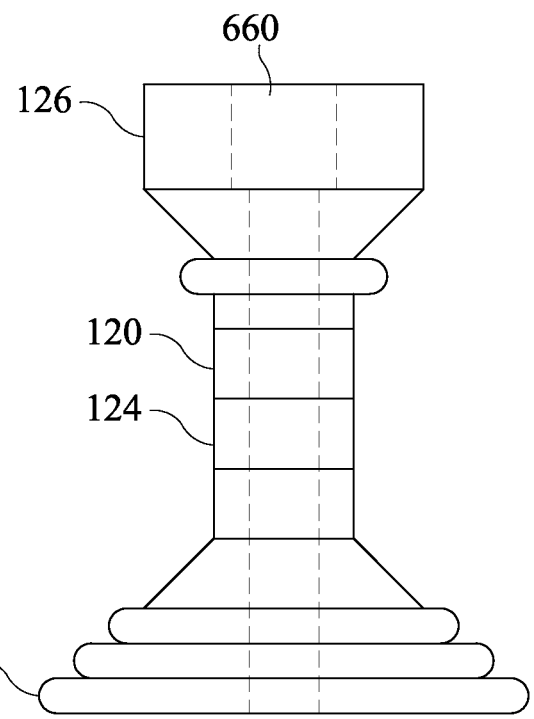
FIG. 4B is a side plan view of the base portion of FIG. 4A.
Figure 4A:
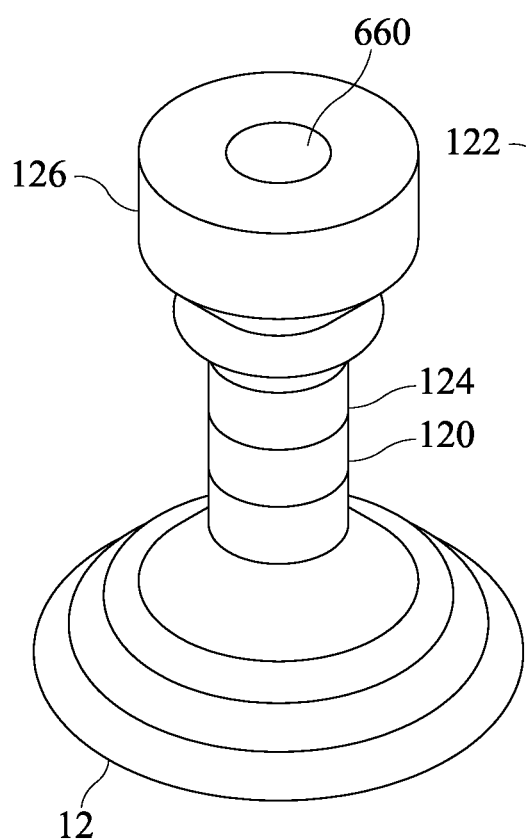
FIG. 4A is a side perspective view of a base portion in accordance with another particular embodiment of the present invention.
Figure 4C:
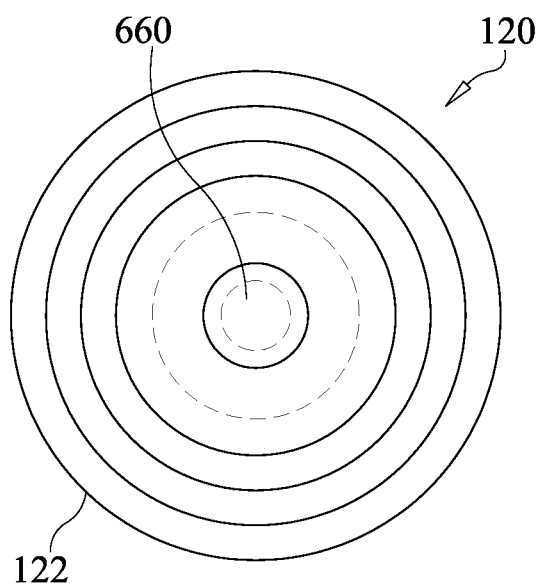
FIG. 4C is an elevational view from the top of the base portion of FIG. 4A.
Figure 5A:
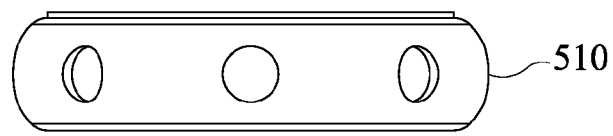
FIGS. 5A-5F are views of a pedestal module for use with a modular support assembly in accordance with another embodiment of the instant invention.
Figure 5B:
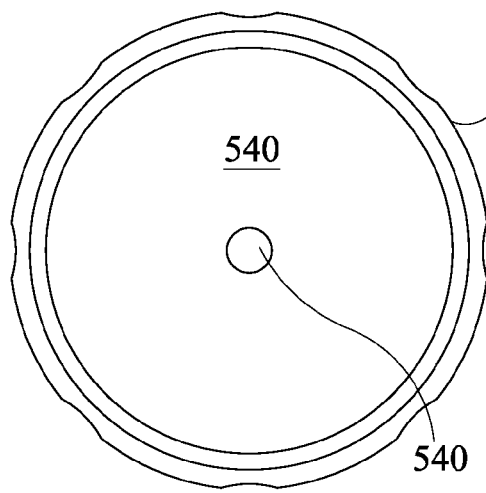
Figure 5C:
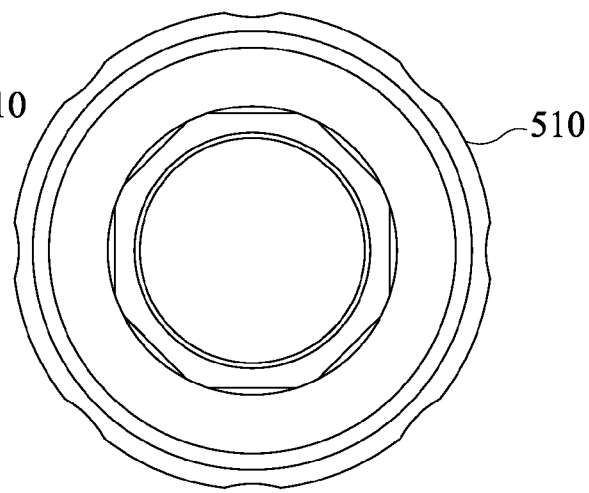
Figure 5D:
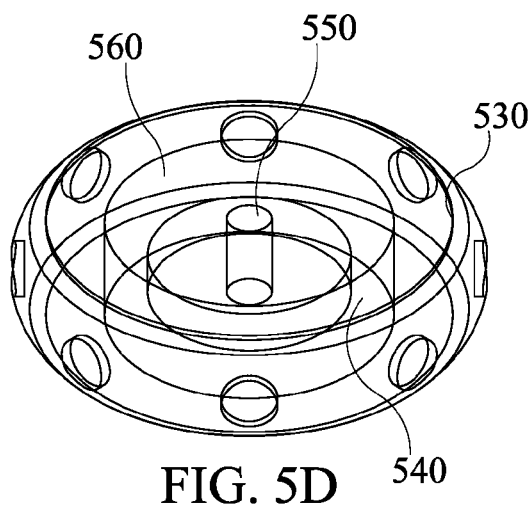
Figure 5E:
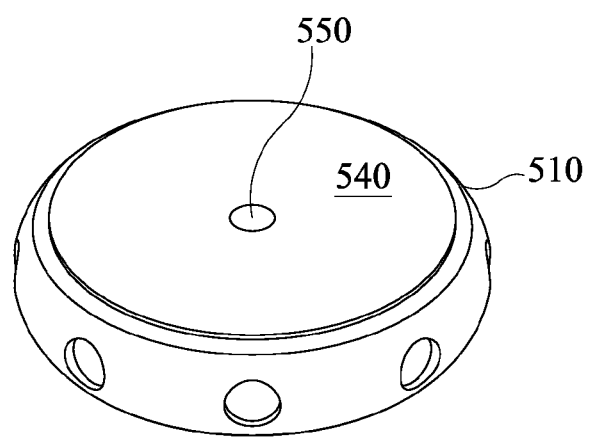
Figure 5F:
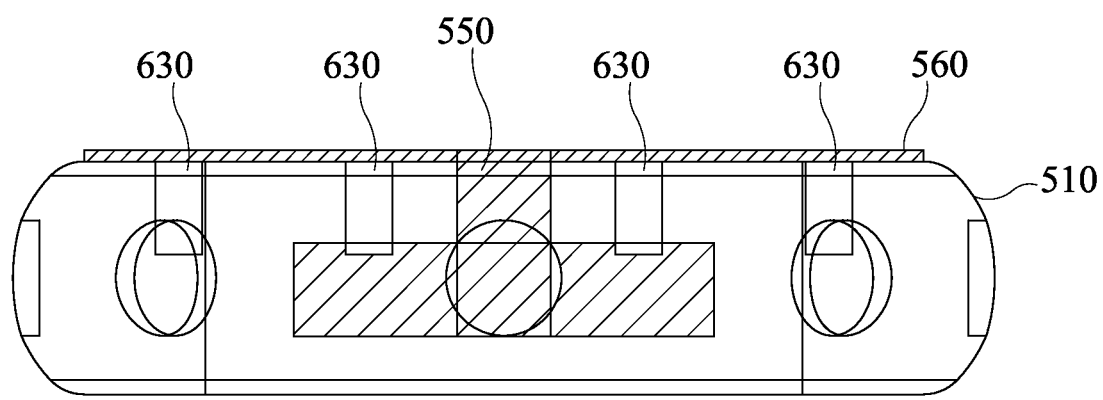

The different sections of the pedestal modules 120, 210 can be made up of several pieces connected together as a composite, or the pedestal modules 120, 210 can be made as a solid piece. If formed as a composite item, magnets may be used to stack up the separate base, neck and support elements of the pedestal module 120. As such, modular neck sections can be added or removed to additionally adjust the height of the pedestal, as shown in FIG. 4B.

In accordance with the instant invention, the pedestal modules 120, 210 can be offered in a variety of sizes and heights, thus further permitting the height adjustment and appearance of the modular support assembly. Other shapes and designs of pedestal module can be provided and still be in keeping with the present invention.

Referring now to FIGS. 5A-5F, there is shown a further embodiment of a pedestal module 510 in accordance with the present invention. In the present particular embodiment, the pedestal module 510 is designed to replace the pedestal module, base insert and first end module of the previously described embodiments. Rather, the pedestal module 510 becomes the first end module of the modular support assembly, for example, replacing the first end module 130 in FIGS. 9 and 10, thus making a completely self standing modular support assembly. In such a case, the object 110 would be supported on the upper surface of the pedestal module 510 and the magnets 630 would engage magnets 610 on the first occurring center module 130 or magnets 620, if no center module is provided.

The pedestal module 510 can be provided with further features to enhance the display of the object 110 of FIG. 1A. For example, a motor 540 can be provided in the pedestal module 510. The motor 540 turns a shaft 550 that rotates a floor 530 upon which the object 110 sits, thus causing the object 110 to revolve within the cavity formed in the holder portion of the modular base assembly (160a of FIG. 1C, 160a' of FIG. 11). Additionally, the floor 530 can be made from a transparent material and the pedestal module 510 can be provided with a light 560 therein (such as a battery powered LED module). The light 560 will provide illumination for the object 110 from beneath the object itself.

The modular support assemblies of the instant invention can be used for providing a modular support assembly for a useful and/or decorative object, for example, for festive centerpieces, for religious rites, for decorative home adornments, etc. As such, the modular support assemblies can be made from decorative materials, such as crystal, glass, wood, metal, gilded wood, acrylic, Lucite, plastic, etc. However, the ornamental appearance of the modular support assembly can be further enhanced, as desired.

For example, referring back to FIGS. 1A-1C, 4A-4C, 6 and 16, the modular support assembly 100 of the instant invention (or any of the described embodiments, as desired) can, optionally, include the windows 170. In the present particular embodiment, the windows 170 can be sized to receive a gem stone or other decorative insert. Alternately, the windows 170 can be made of a clear material such that a decoration on an item behind the window can be seen therethrough. For example, a decoration on the object 110 could be visible through the windows 170, if desired. Alternately, as shown more particularly in FIGS. 6 and 9, if desired, the center module 140 and/or any of the end modules 130, 150, 510, can include a plurality of pockets 180 for slidably receiving an insert 600 therein.

In one particular embodiment of the invention, the insert 600 includes a decorative indicia on the outside thereof which, when the insert 600 is mounted in the pocket 180, is visible through the windows 170. Such decorative indicia can include decorative symbols and/or religious symbols, such as a peace sign, an Om symbol, a cross, a Star of David, etc. FIGS. 12A-12E show various examples of inserts including decorative indicia in accordance with the instant invention. The indicia can also be customizable and replaceable. For example, if the modular holder assembly 100 is used as a centerpiece on the table for a wedding, the names of the bride and groom and the date of the wedding can be placed on the outside of the insert 600 to be visible through the windows 170.

Additionally, if desired, each insert 600 can include a small, battery powered, LED light and circuit to illuminate the decorative indicia, the modular support assembly and/or the object 110.

Further, in one particular embodiment of the present invention, the inserts 600 can be and/or include magnets. FIGS. 13A-13E show various possible configurations of inserts including magnets 600a in accordance with various embodiments of the instant invention. Alternately, the entire insert 600 can be made as a magnet. As such, the magnetic inserts 600 can be arranged around the circumferential periphery of the ring 140 to produce a desired magnetic flux inside the ring 140. This flux can be further affected by the orientation of the magnets in the base insert 125 and/or the pedestal module 120. FIGS. 8A-8D show four possible variations V1-V4 for arranging the magnets 600, 640 and 660 in the center modules 140, base insert 125 and pedestal module 120, respectively, to achieve a desired magnetic flux within the chamber 160a of the modular support assembly 100. Note that, as shown in FIG. 9, the magnetic flux within the chamber 160a, 160a' can be enhanced by the addition of further center modules 140, each including a ring of magnets 600. In the present particular embodiment, each center module 140 includes eight (8) magnets/magnetic inserts 600 in pockets 180 around the periphery thereof. The use of eight magnets/magnetic inserts 600 per center module 140 is not meant to be limiting, as more or fewer magnets/magnetic inserts 600 can be used, as desired.

In accordance with one particular embodiment of the invention, the magnets 600 are coated or encased in a skin or sheath on which is printed a decorative indicia. Alternately, a sticker with the decorative indicia can be placed on the side of the magnet 600 facing the outside of the ring 140. As such, this decorative indicia can be visible through the window 170 when the magnet 600 is seated in the pocket 180. It is important to note, however, that if the rings 140 are made from a clear material such as crystal, Lucite, acrylic, etc., than the windows 170 are unnecessary and can be omitted. Rather, in such a case, the indicia on the magnets 600 will be visible through the ring itself, without the need for any added window 170.

The end modules 130, 150 can also include pockets for receiving magnets 600, if desired, as shown in connection with the embodiment of FIGS. 14A-14D. As such, the end modules 130, 150 can also, optionally, include windows 170 for showing a decorative indicia therethrough. Alternately, or in addition thereto, the windows 170 of any of the modules can be used to receive other decorative indicia, such as gemstones 175, logos, inserts, etc. It should be understood that, as with the center modules 140, the windows 170 can also be omitted from the end modules 130 150, if desired.

As can be seen from the figures and the foregoing description, there is provided herein a modular support assembly for a useful and/or decorative object, the modules of which assembly are held together in proper alignment by magnetic force attractions. The height of the modular assembly can be adjusted, as desired, by the addition/removal of various modules to/from the assembly. Such modules can include, but are not necessarily limited to, a pedestal module, a base insert and modular rings, all aligned and held in place using magnetic force attraction.

It should be noted that the ring modules 130, 140, 150 can be made in any desired diameter, height and thickness, and still be in keeping with the spirit of the instant invention. Additionally, if desired, the modules 130, 140, 150 need not be made as rings, but rather, could be made as stackable ovals, squares, rectangles, hexagons, etc. having a hole therethrough, and still provide the desired functionality of the present invention. The term "annular module" used herein, is desired to cover all such shapes and not be limited merely to circular shaped modules.

Similarly, all modules/parts of the instant invention can be made from any desired material, such as, but not limited to, plastic, wood, metal, cardboard, etc. The pieces can be molded (such as by injection molding or casting) or machined to the desired shapes. Further, the numbers of magnets illustrated in the figures are not meant to be limiting, as any desired number of magnets 610, 620, 630, 640, 650, 660, can be used, so long as they sufficiently align and lock the modular support assembly together in the desired fashion. Further, the decorative features described herein are not meant to limit the invention thereto, but are meant to provide examples of such decorations as can be used on/applied to the device of the instant invention. As such, although the invention is illustrated and described herein, various modifications and structural changes may be made therein without departing from the spirit of the invention and within the scope and range of equivalents of the claims.

What is claimed is:

1. A modular support assembly, comprising:
   a first annular ring having a body made from a non-magnetic material, said first annular ring including a plurality of first magnets embedded around a circumferential periphery of the first annular ring to produce a desired magnetic flux inside the first annular ring;
   at least a second annular ring having a body made of a non-magnetic material, said at least a second annular ring including a plurality of second magnets embedded around a circumferential periphery of the second annular ring to produce a desired magnetic flux inside the second annular ring;
   said first annular ring and said at least a second annular ring being aligned to one another and removeably held together by a magnetic force attraction between said plurality of first magnets and said plurality of second magnets; and
   a first base portion engaging the first annular ring.

2. The modular support assembly of claim 1, wherein the first base portion engages the first annular ring by a frictional fit into the annulus of the first annular ring.

3. The modular support assembly of claim 1, wherein a magnet of the first base portion engages the at least a first magnet of the first annular ring.

4. The modular support assembly of claim 2, further including a pedestal module including a magnet, the magnet of the pedestal module engaging the magnet of the first base portion.

5. The modular support assembly of claim 4, further including at least a second base portion including a magnet, the magnet of said second base portion engaging the magnet of said first base portion to hold said second base portion to said first base portion distal from said pedestal module.

6. The modular support assembly of claim 1, wherein said at least a second annular ring includes a plurality of annular rings each including a plurality of magnets, a plurality of magnets of each annular ring engaging a plurality of magnets of another annular ring to form a tower of said annular rings, said tower defining a chamber therein.

7. The modular support assembly of claim 6, wherein each annular ring includes a plurality of magnets disposed with their positive poles proximal to a first face of the annular ring and a plurality of magnets disposed with their negative poles proximal to a second face of the annular ring.

8. The modular support assembly of claim 6, wherein each annular ring includes a plurality of magnets of alternating polarities proximal to a first face of the annular ring and a plurality of magnets disposed with alternating polarities proximal to a second face of the annular ring.

9. The modular support assembly of claim 6, wherein each annular ring includes a plurality of bipole magnets disposed around the periphery of the annular ring, wherein a first pole of each of said bipole magnets is disposed proximal to a first face of said annular ring and a second pole of each of said bipole magnets is disposed proximal to a second face of said annular ring.

10. The modular support assembly of claim 1, wherein said annular ring includes a window in an outside face of the annular ring, said window sized to receive an insert therein.

11. The modular support assembly of claim 10, wherein the window is sized to receive a gem.

12. The modular support assembly of claim 10, wherein the window is sized to receive a graphical indicia.

13. A modular support assembly, comprising:
   a first annular module including a first plurality of magnets arranged around the periphery of said first annular module;
   at least a second annular module including a second plurality of magnets arranged around the periphery of said at least a second annular module;
   said first annular module and said at least a second annular module being aligned to one another and removeably held together by a magnetic force attraction when magnetic fields of the plurality of second magnets of the at least a second annular module engages magnetic fields of the plurality of first magnets of the first annular module to form an annular wall; and
   wherein said first annular module includes a second magnetic material in the periphery of said first annular module and said modular support assembly includes a first base portion including a magnetic material, said magnetic material of said first base portion engaging the second magnetic material of said first annular module to form a modular support assembly.

14. The modular support assembly of claim 13, wherein the magnetic material of said first annular module includes a magnet and the magnetic material of said second annular module also includes a magnet.

15. The modular support assembly of claim 13, wherein the magnetic material of said first annular module includes a magnet and the magnetic material of said second annular module is a material that is strongly attracted to a magnet.

16. A modular support assembly, comprising:
a first annular module having a plurality of first magnets arranged around the body of said first annular module at or proximal to an upper surface of said first annular module;
at least a second annular module having a plurality of second magnets arranged around the body of said at least a second annular module at or proximal to a lower surface of said at least a second annular module;
said first annular module and said at least a second annular module being aligned to one another and removeably held together by a magnetic force attraction between said plurality of first magnets and said plurality of second magnets; and
each of said first annular module and said second annular module including a plurality of pockets formed in its respective body, each of said plurality of pockets including an insert slideably received therein.

17. The modular support assembly of claim 16, wherein at least one insert of each of said first annular module and said second annular module is or includes at least one magnet.

\* \* \* \* \*